US012659618B2

(12) United States Patent
Nishitani et al.

(10) Patent No.: US 12,659,618 B2
(45) Date of Patent: Jun. 16, 2026

(54) IMAGE PROCESSING DEVICE AND IMAGE CAPTURING DEVICE THAT PERFORM DEMOSAIC PROCESS

(71) Applicant: LAPIS Technology Co., Ltd., Yokohama (JP)

(72) Inventors: Naoki Nishitani, Yokohama (JP); Yuki Imatoh, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 66 days.

(21) Appl. No.: 18/637,480

(22) Filed: Apr. 17, 2024

(65) Prior Publication Data

US 2024/0357251 A1 Oct. 24, 2024

(30) Foreign Application Priority Data

Apr. 19, 2023 (JP) ................................. 2023-068792

(51) Int. Cl.
| | |
|---|---|
| *H04N 25/708* | (2023.01) |
| *H04N 25/46* | (2023.01) |
| *H04N 25/77* | (2023.01) |
| *H04N 25/78* | (2023.01) |

(52) U.S. Cl.
CPC ........... *H04N 25/708* (2023.01); *H04N 25/46* (2023.01); *H04N 25/77* (2023.01); *H04N 25/78* (2023.01)

(58) Field of Classification Search
CPC ...... H04N 25/708; H04N 25/46; H04N 25/78; H04N 25/77; H04N 23/84; H04N 1/4092; H04N 1/6005; G06T 7/13; G06T 7/136; G06T 2207/10024
See application file for complete search history.

(56) References Cited

U.S. PATENT DOCUMENTS

| | | | | |
|---|---|---|---|---|
| 9,232,222 | B2 * | 1/2016 | Romanovskiy | ...... H04N 19/103 |
| 2014/0368891 | A1 * | 12/2014 | Beato | ................... G06V 10/243 |
| | | | | 382/165 |
| 2017/0004620 | A1 * | 1/2017 | Kitamura | .............. G06T 7/0016 |
| 2017/0039682 | A1 * | 2/2017 | Oh | ............................ G06T 7/90 |
| 2018/0357769 | A1 * | 12/2018 | Roth | ......................... G06T 7/13 |
| 2021/0402987 | A1 * | 12/2021 | Kaneko | .................. G06V 10/56 |
| 2022/0400234 | A1 * | 12/2022 | Sakoguchi | ................ G06T 7/13 |

FOREIGN PATENT DOCUMENTS

JP          2014200033          10/2014

* cited by examiner

*Primary Examiner* — Kelly L Jerabek
(74) *Attorney, Agent, or Firm* — JCIPRNET

(57) ABSTRACT

An image processing device derives an edge component value of a pixel of interest by performing an edge detection process using a brightness of the pixel of interest and brightnesses of peripheral pixels of the pixel of interest of image information including the brightness and a color difference of each pixel, derives an average of the color differences of the pixel of interest and the peripheral pixels, derives a median of the color differences of the pixel of interest and the peripheral pixels, and selects one of the average and the median as the color difference of the pixel of interest by using the edge component value, the average, and the median.

8 Claims, 4 Drawing Sheets

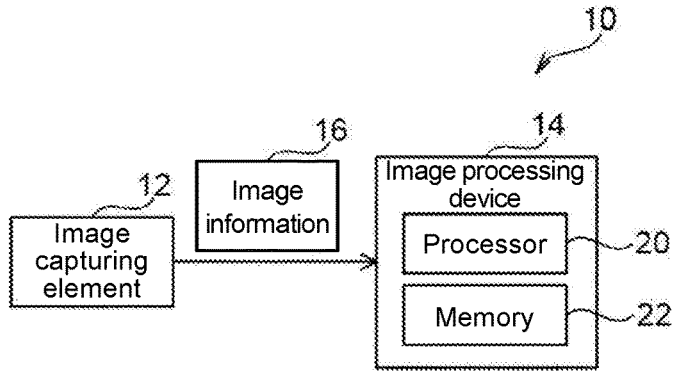
FIG. 1
| G | R | G | R |
|---|---|---|---|
| B | G | B | G |
| G | R | G | R |
| B | G | B | G |
FIG. 2
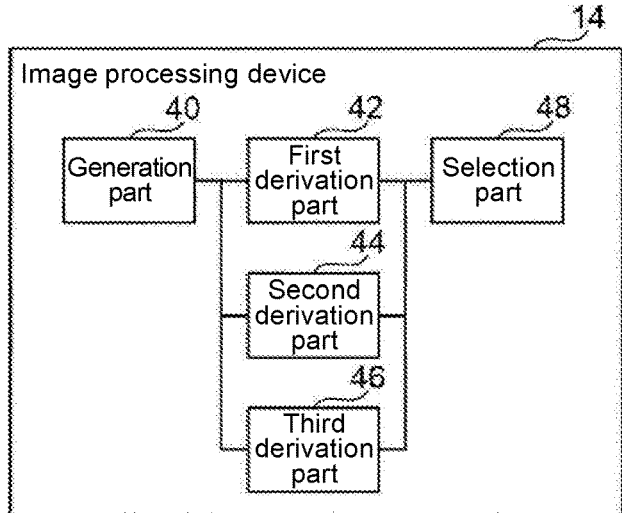
FIG. 3

Color difference (Cb)     → Average Cb_ave

Color difference (Cr)     → Average Cr_ave

Color difference (Cb)     Sort → Median Cb_med

Color difference (Cr)     Sort → Median Cr_med

IMAGE PROCESSING DEVICE AND IMAGE CAPTURING DEVICE THAT PERFORM DEMOSAIC PROCESS

CROSS-REFERENCE TO RELATED APPLICATION

This application claims priority under 35 USC 119 from Japanese Patent application No. 2023-068792 filed on Apr. 19, 2023, the disclosure of which is incorporated by reference herein.

BACKGROUND

Technical Field

The disclosure relates to an image processing device and an image capturing device performing a demosaic process.

Description of Related Art

Japanese Laid-open No. 2014-200033 discloses an image processing device which sets a reference area that is a region formed by a predetermined number of pixels with respect to a first image formed by an image signal output from a single-plate type pixel part where pixels corresponding to respective color components of multiple color components are regularly arranged on a plane and the reference area, and which changes the region of the reference area. The image processing device evaluates statistics obtained from pixel values of the pixels in the reference area and detects the directionality of a position of interest in the first image.

By using the technique disclosed in Japanese Laid-open No. 2014-200033, the interpolated color difference in the horizontal direction and the interpolated color difference in the vertical direction are calculated, and the statistics of the interpolated color differences in the reference area are calculated. Therefore, the computational load may increase.

The disclosure provides an image processing device and an image capturing device capable of executing a demosaic process that suppresses a false color while reducing the computational load.

SUMMARY

An image processing device according to an aspect of the disclosed technique includes: a first derivation part, deriving an edge component value of a pixel of interest by performing an edge detection process using a brightness of the pixel of interest and brightnesses of peripheral pixels of the pixel of interest of image information comprising the brightness and a color difference of each pixel; a second derivation part, deriving an average of the color differences of the pixel of interest and the peripheral pixels; a third derivation part, deriving a median of the color differences of the pixel of interest and the peripheral pixels; and a selection part, selecting one of the average and the median as the color difference of the pixel of interest by using the edge component value, the average, and the median.

An image capturing device according to another aspect of the disclosed technique includes: an image capturing element, outputting first image information in which each pixel has a pixel value of a color of a plurality of different colors; and an image processing device, including: a generation part, generating second image information comprising a brightness and a color difference in each pixel by using the first image information; a first derivation part, deriving an edge component value of a pixel of interest by performing an edge detection process using the brightness of the pixel of interest and the brightnesses of peripheral pixels of the pixel of interest of the second image information; a second derivation part, deriving an average of the color differences of the pixel of interest and the peripheral pixels; a third derivation part, deriving a median of the color differences of the pixel of interest and the peripheral pixels; and a selection part, selecting one of the average and the median as the color difference of the pixel of interest by using the edge component value, the average, and the median.

BRIEF DESCRIPTION OF THE DRAWINGS

FIG. 1 is a block diagram illustrating an example of a configuration of an image capturing device.

FIG. 2 is a diagram illustrating first image information.

FIG. 3 is a block diagram illustrating an example of a functional configuration of an image processing device.

DESCRIPTION OF THE EMBODIMENTS

Figure 4:
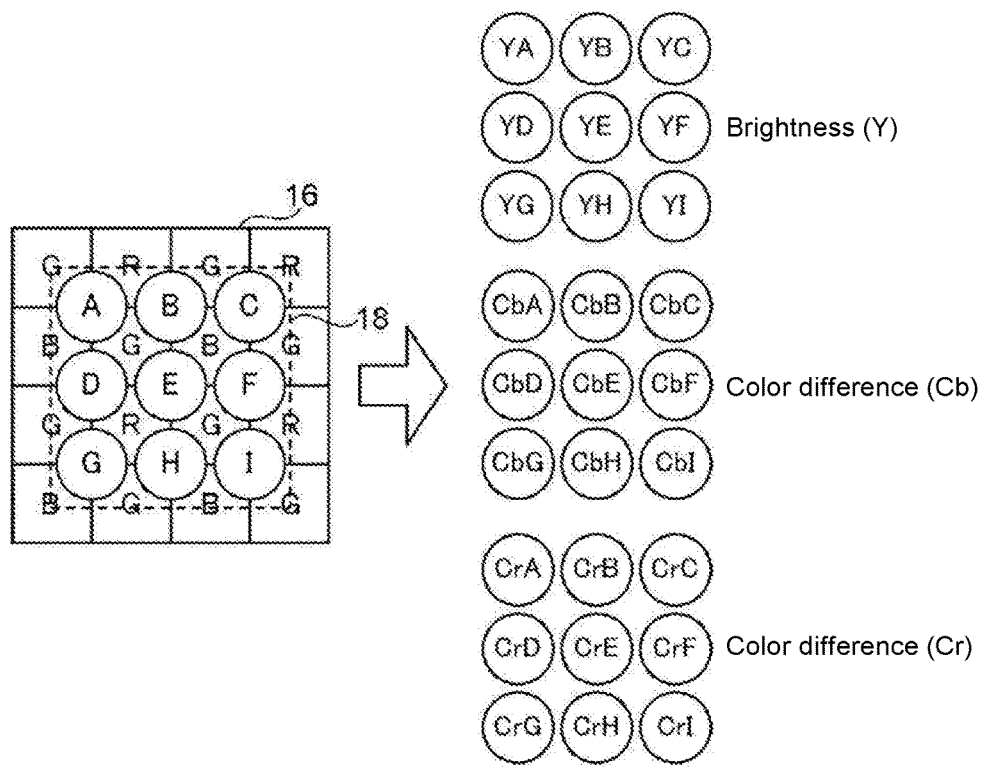
FIG. 4 is a diagram illustrating a process for generating second image information.

According to the disclosure, a demosaic process in which the computational load is reduced and which is performed for a single-plate type image sensor can be performed.

In the following, the embodiments for implementing the technique of the disclosure are described in detail with reference to the technique of the disclosure.

Firstly, referring to FIG. 1, the configuration of an image capturing device 10 according to the embodiment is described. As shown in FIG. 1, the image capturing device 10 includes an image capturing element 12 and an image processing device 14. The image processing device 14 includes a processor 20 and a memory 22. Examples of the processor 20 include a programmable logic device (PLD) whose circuit configuration can be modified after being manufactured, such as a field programmable gate array (FPGA), etc. The processor 20 may be a central processing unit (CPU), etc., that is a general-purpose processor executing software (program). In addition, the processor 20 may also be a combination of two or more processors of the same or different types. The memory 22 is a volatile memory, and is used as a temporary storage area.

The image capturing element 12 is an image sensor, such as a charge coupled device (CCD) image sensor or a complementary metal oxide semiconductor (CMOS) image sensor. The image capturing element 12 outputs image information 16 in which each pixel has a pixel value of one of multiple different colors. The image information 16 is an example of first image information related to the disclosed technique.

As shown in FIG. 2, the image capturing element 12 according to the embodiment outputs the image information

16 in which a pixel having a pixel value of red (R), a pixel having a pixel value of green (G), and a pixel having a pixel value of blue (B) are arranged in a Bayer array. In FIG. 2, an example in which the image information 16 has 16 pixels is shown.

The image processing device 14 has a function of performing a demosaic process with respect to the image information 16 input from the image capturing element 12. Referring to FIG. 3, a functional configuration of the image processing device 14 according to the embodiment is described. As shown in FIG. 3, the image processing device 14 includes a generation part 40, a first derivation part 42, a second derivation part 44, a third derivation part 46, and a selection part 48. The processor 20 serves as the generation part 40, the first derivation part 42, the second derivation part 44, the third derivation part 46, and the selection part 48 by executing a program set in advance.

Pre-processing, such as defective pixel correction, black level adjustment, and white balance adjustment, is performed with respect to the image information 16 input from the image capturing element 12, and the image information 16 after the pre-processing has been performed is input to the generation part 40. As shown in FIG. 4, the generation part 40 generates image information 18 including the brightness and the color difference in each pixel by using the image information 16. The image information 18 is an example of second image information according to the disclosed technique. FIG. 4 illustrates an example of generating the image information 18 of 9 pixels from the image information 16 of 16 pixels.

Figure 5:
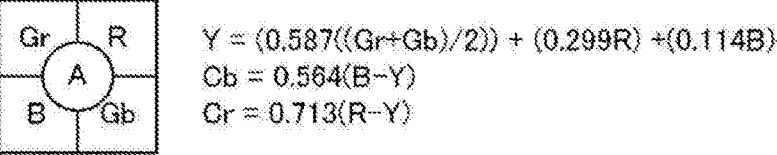
FIG. 5 is a diagram illustrating a process for calculating brightness and color difference.

Specifically, as shown in FIG. 5, the generation part 40 calculates a brightness Y, a color difference Cb, and a color difference Cr of each pixel of the image information 18 by using the pixel values of four adjacent pixels in the image information 16 according to Formulae (1) to (3) below. The coefficients in Formulae (1) to (3) are merely an example, and the invention is not limited to the example. In addition, as the formula that converts RGB into YCbCr, a simplified formula with reduced accuracy may be used.

$$Y = (0.587((Gr + Gb)/2)) + (0.299R) + (0.114B) \quad (1)$$

$$Cb = 0.564(B - Y) \quad (2)$$

$$Cr = 0.713(R - Y) \quad (3)$$

In the example of FIG. 4, A to I represent the respective pixels of the image information 18, YA to YI represent the brightnesses of the respective pixels, CbA to CbI represent the color differences Cb of the respective pixels, and CrA to CrI represent the color differences Cr of the respective pixels.

The first derivation part 42 derives an edge component value of a pixel of interest by performing an edge detection process using the brightness of the pixel of interest and the brightnesses of peripheral pixels of the pixel of interest in the image information 18. Here, the peripheral pixels refer to the eight pixels on the periphery that are adjacent to the pixel of interest.

Figure 6:
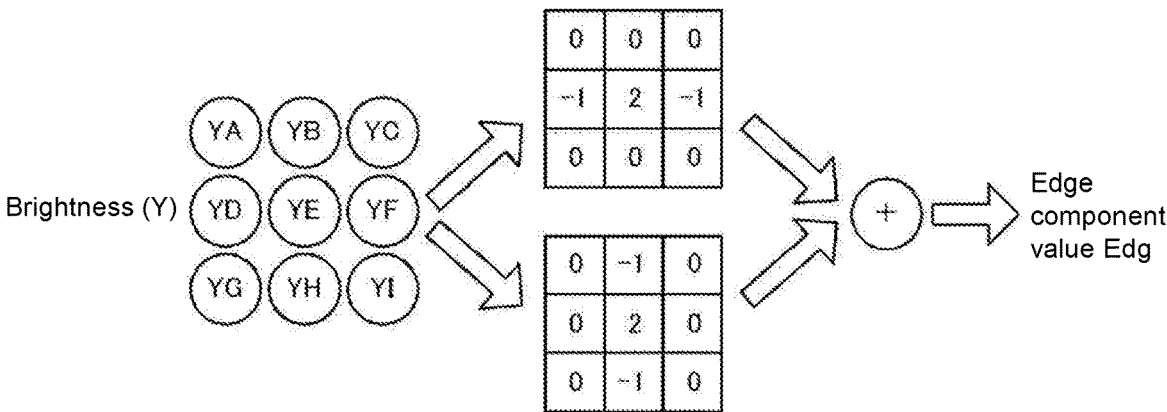
FIG. 6 is a diagram illustrating a process for deriving an edge component value.

As shown in FIG. 6, the first derivation part 42 respectively applies a filter that emphasizes the edge in the vertical direction and a filter that emphasizes the edge in the horizontal direction with respect to the brightness of the pixel of interest and the brightnesses of the peripheral pixels in the image information 18, and derives an edge component value Edg of the pixel of interest by adding up the application results of the respective filters. In FIG. 6, an example in which a pixel E is the pixel of interest, and pixels A to D and F to I are peripheral pixels is shown. The edge derivation process shown in FIG. 6 merely serves as an example, and other filters may also be used.

Figure 7:
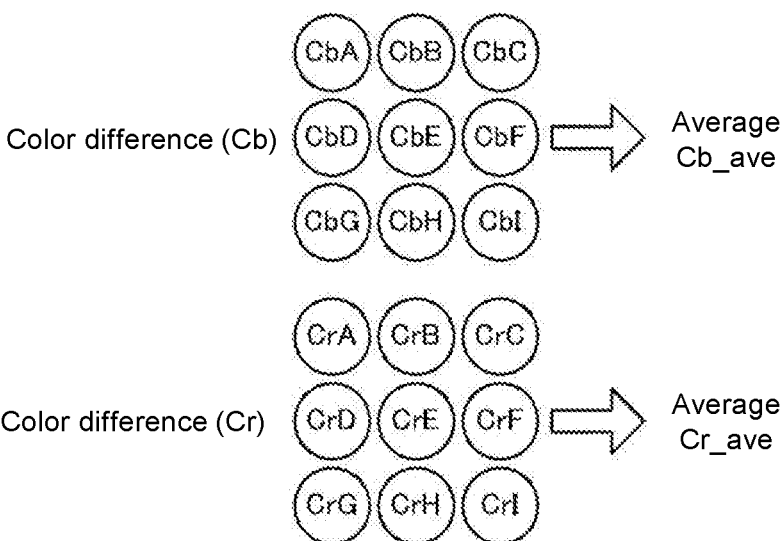
FIG. 7 is a diagram illustrating a process for deriving an average of the color differences.

As shown in FIG. 7, the second derivation part 44 derives an average Cb_ave of the color differences Cb of the pixel of interest and the peripheral pixels. In addition, the second derivation part 44 derives an average Cr_ave of the color differences Cr of the pixel of interest and the peripheral pixels.

Figure 8:
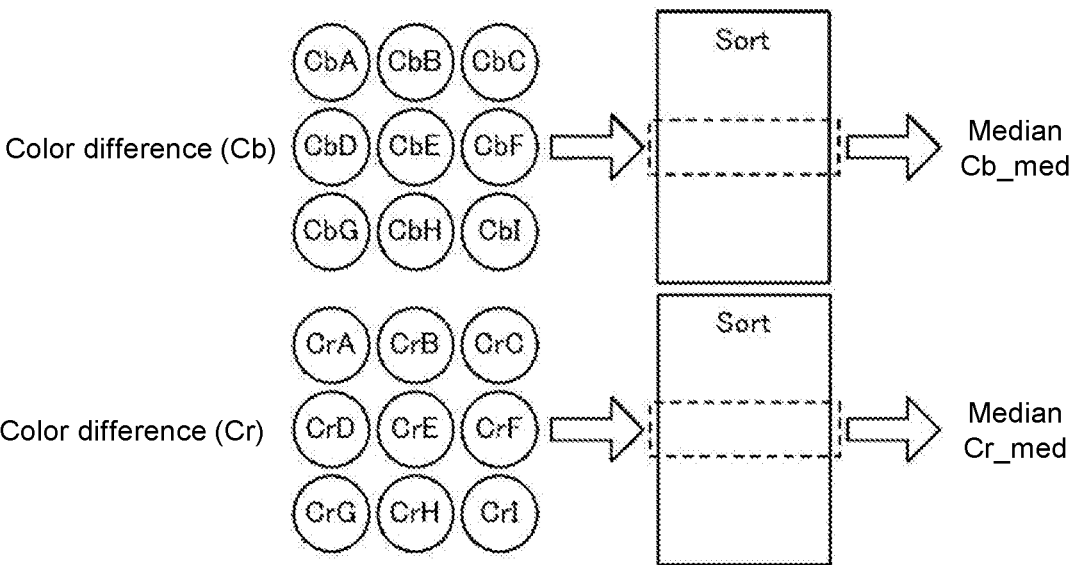
FIG. 8 is a diagram illustrating a process for deriving a median of the color differences.

As shown in FIG. 8, the third derivation part 46 derives a median Cb_med of the color differences Cb of the pixel of interest and the peripheral pixels by sorting the color differences Ch of the pixel of interest and the peripheral pixels in an ascending or descending order and specifying the median Cb_med of the color differences Cr of the pixel of interest and the peripheral pixels. In addition, the third derivation part 46 derives a median Cr_med of the color differences Cr of the pixel of interest and the peripheral pixels by sorting the color differences Cr of the pixel of interest and the peripheral pixels in an ascending or descending order and specifying the median Cr_med of the color differences Cr of the pixel of interest and the peripheral pixels.

The selection part 48 selects one of the average Cb_ave and the median Cb_med as the color difference Cb of the pixel of interest by using the edge component value Edg, the average Cb_ave, and the median Cb_med.

Specifically, in the case where the absolute value of the average Cb_ave is equal to or less than the absolute value of the median Cb_med, the selection part 48 selects the average Cb_ave as the color difference Cb of the pixel of interest. In addition, in the case where the absolute value of the average Cb_ave exceeds the absolute value of the median Cb_med and the case where the absolute value of the edge component value Edg exceeds a threshold, the selection part 48 selects the median Cb_med as the color difference Cb of the pixel of interest. In addition, in the case where the absolute value of the average Cb_ave exceeds the absolute value of the median Cb_med and the case where the absolute value of the edge component value Edg is less than or equal to the threshold, the selection part 48 selects the average Cb_ave as the color difference Cb of the pixel of interest. Moreover, regarding the color difference Cr, like the color difference Cb, the selection part 48 selects one of the average Cr_ave and the median Cr_med as the color difference Cr of the pixel of interest by using the edge component value Edg, the average Cr_ave, and the median Cr_med.

The selection part 48 replaces the color difference Cb and the color difference Cr of the pixel of interest in the image information 18 with the color difference Ch and the color difference Cr that are selected. Post-processing, such as profile emphasis, hue adjustment, is performed with respect to the image information 18 in which the color differences Cb and Cr are replaced. The image information after the post-processing has been performed is output to a non-volatile storage device, etc., included in the image processing device 10.

Figure 9:
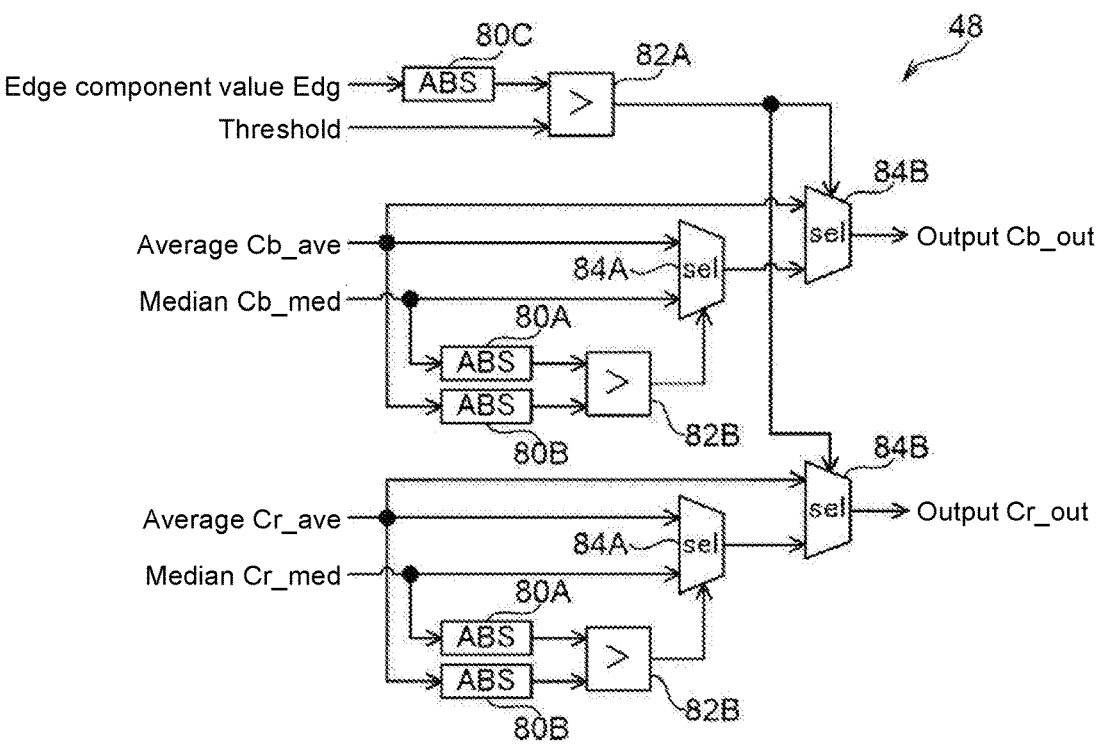
FIG. 9 is a schematic diagram illustrating an example of a circuit configuration of a selection part.

FIG. 9 illustrates an example of a circuit configuration for realizing the selection part 48. As shown in FIG. 9, the selection part 48 includes calculation circuits 80A, 80B, and 80C for calculating absolute values, comparison circuits 82A, 82B for comparing the magnitudes of two inputs, and selectors 84A, 84B. Since the circuit configuration of the portion relating to the selection of the color difference Cb and the circuit configuration of the portion relating to the selection of the color difference Cr are the same configurations, the circuit configuration of the portion relating to the selection of the color difference Cb is described, whereas the description of the circuit configuration of the portion relating to the selection of the color difference Cr is omitted.

The edge component value Edg is input to the calculation circuit 80C, and the calculation circuit 80C outputs the absolute value of the edge component value Edg to the comparison circuit 82A. The absolute value of the edge component value Edg and the threshold are input to the comparison circuit 82A. The comparison circuit 82A determines whether the absolute value of the edge component value Edg exceeds the threshold, and outputs the determination result to the selector 84B. The median Cb_med is input to the calculation circuit 80A, and the calculation circuit 80A outputs the absolute value of the median Cb_med to the comparison circuit 82B. The average Cb_ave is input to the calculation circuit 80B, and the calculation circuit 80B outputs the absolute value of the average Cb_ave to the comparison circuit 82B.

The comparison circuit 82B determines whether the absolute value of the average Cb_ave exceeds the median Cb_med, and outputs the determination result to the selector 84A.

The average Cb_ave, the median Cb_med, and the output of the comparison circuit 82B are input to the selector 84A. The selector 84A selects one of the average Cb_ave and the median Cb_med based on the output of the comparison circuit 82B and outputs the selected one to the selector 84B.

Specifically, in the case where the absolute value of the average Cb_ave is equal to or less than the absolute value of the median Cb_med, the selector 84A selects the average Cb_ave and outputs the average Cb_ave to the selector 84B. Meanwhile, in the case where the absolute value of the average Cb_ave exceeds the absolute value of the median Cb_med, the selector 84A selects the median Cb_med and outputs the median Cb_med to the selector 84B.

The average Cb_ave, the output of the selector 84A, and the output of the comparison circuit 82A are input to the selector 84B. The selector 84B selects one of the average Cb_ave and the output of the selector 84A based on the output of the comparison circuit 82A and outputs the selected one.

Specifically, in the case where the absolute value of the edge component value Edg exceeds the threshold, the selector 84B selects and outputs the output of the selector 84A. Specifically, in the case where the absolute value of the edge component value Edg is equal to or less than the threshold, the selector 84B selects and outputs the average Cb_ave.

The output of the selector 84A is the average Cb_ave in the case where the absolute value of the average Cb_ave is equal to or less than the absolute value of the median Cb_med, and the output of the selector 84A is the median Cb_med in the case where the absolute value of the average Cb_ave exceeds the absolute value of the median Cb_med. That is, in the case where the absolute value of the average Cb_ave is equal to or less than the absolute value of the median Cb_med, the same average Cb_ave is input to the selector 84B. Therefore, regardless of whether the absolute value of the edge component value Edg exceeds the threshold, the selector 48 outputs the average Cb_ave. In the case where the absolute value of the average Cb_ave exceeds the absolute value of the median Cb_med, the selector 84B selects one of the average Cb_ave and the median Cb_med in accordance with the determination result on whether the absolute value of the edge component value Edg exceeds the threshold.

Figure 10:
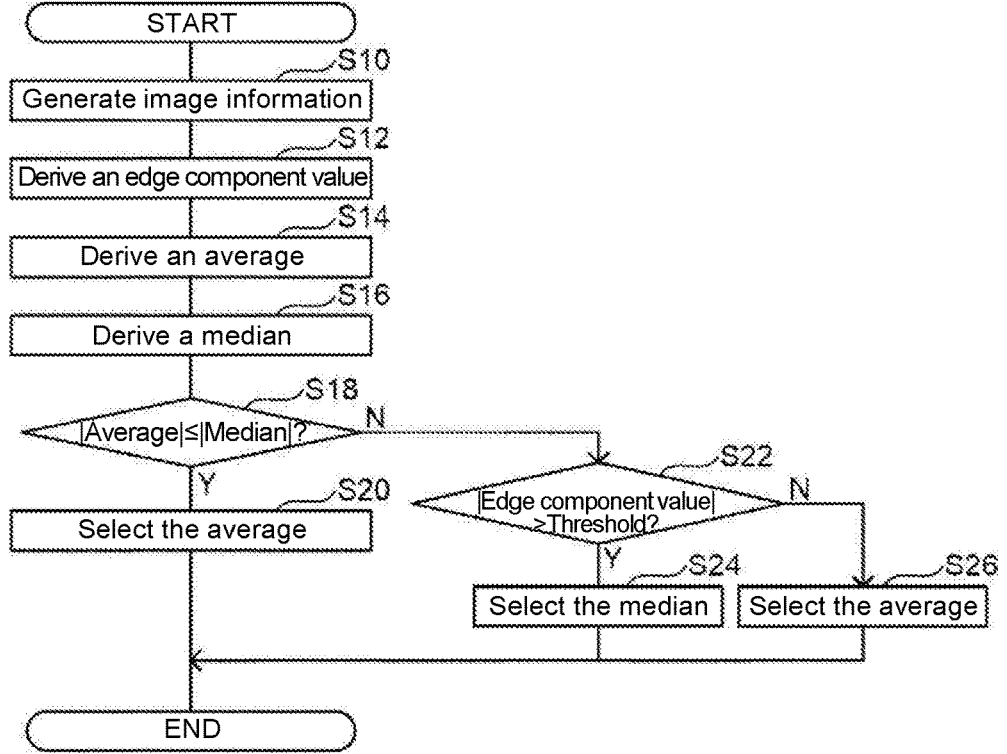
FIG. 10 is a flowchart illustrating an example of a demosaic process.

Then, the functionality of the image processing device 14 according to the embodiment is described with reference to FIG. 10. The demosaic process shown in FIG. 10 is executed in the case where the image information 16 is input to the image processing device 14 from the image capturing element 12. Here, between the color differences Cb and Cr, the color difference Cb is described, and the description about the color difference Cr is omitted. However, a process same as that of the color difference Cb is also executed for the color difference Cr.

In S10 of FIG. 10, the generation part 40 generates the image information 18 including the brightnesses and color differences of the respective pixels by using the image information 16, as described above. In Step S12, the first derivation part 42 derives the edge component value Edg of the pixel of interest by performing an edge detection process using the brightness of the pixel of interest and the brightnesses of the peripheral pixels of the image information 18 generated in Step 10, as described above.

In Step S14, the second derivation part 44 derives the average Cb_ave of the color differences Cb of the pixel of interest and the peripheral pixels of the image information 18 generated in Step S10. In Step S16, the third derivation part 46 derives the median Cb_med of the color differences Cb of the pixel of interest and the peripheral pixels by sorting the color differences Cb of the pixel of interest and the peripheral pixels of the image information 18 generated in Step S10 in an ascending or descending order and specifying the median Cb_med of the color differences Cb of the pixel of interest and the peripheral pixels.

In Step S18, the selection part 48 determines whether the absolute value of the average Cb_ave derived in Step 14 is equal to or less than the absolute value of the median Cb_med derived in Step S16. In the case where the determination is affirmative (Yes), the process proceeds to Step S20. In Step S20, the selection part 48 selects the average Cb_ave as the color difference Cb of the pixel of interest. After the process of Step S20 ends, the demosaic process ends.

In the case where the determination of Step S18 is negative (No), the process proceeds to Step S22. In Step S22, the selection part 48 determines whether the absolute value of the edge component value Edge derived in Step S12 exceeds the threshold. In the case where the determination is affirmative (Yes), the process proceeds to Step S24. In Step S24, the selection part 48 selects the median Cb_med as the color difference Cb of the pixel of interest. After the process of Step S24 ends, the demosaic process ends.

In the case where the determination of Step S22 is negative (No), the process proceeds to Step S26. In Step S26, the selection part 48 selects the average Cb_ave as the color difference Cb of the pixel of interest. After the process of Step S26 ends, the demosaic process ends. The demosaic process is repetitively executed while the pixel of interest of the pixel information 18 is changed.

As described above, according to the embodiment, in the case where the absolute value of the edge component is equal to or less than the threshold, i.e., in a position other than the edge, the average of the color difference is used. Meanwhile, in the case where the absolute value of the edge component value exceeds the threshold, that is, in the vicinity of the edge where a color difference particularly easily occurs, the smaller value between the average and the median of the color difference is used. Accordingly, the demosaic process that can prevent the color from fading in positions other than the edge and reduce false colors at the edge can be executed. In addition, according to the embodiment, the computational load can be reduced. Therefore, it is possible to, for example, perform real-time processing by using a relatively small-scale processor, such as an image signal processor (ISP) provided in a vehicle-mounted camera.

What is claimed is:

1. An image processing device, comprising:
a processor, configured to:
derive an edge component value of a pixel of interest by performing an edge detection process using a brightness of the pixel of interest and brightnesses of peripheral pixels of the pixel of interest of image information comprising the brightness and a color difference of each pixel;
derive an average of the color differences of the pixel of interest and the peripheral pixels;
derive a median of the color differences of the pixel of interest and the peripheral pixels; and
select one of the average and the median as the color difference of the pixel of interest by using the edge component value, the average, and the median.

2. The image processing device as claimed in claim 1, wherein, in a case where an absolute value of the average is equal to or less than an absolute value of the median, the processor selects the average as the color difference of the pixel of interest.

3. The image processing device as claimed in claim 2, wherein, in a case where the absolute value of the average exceeds the absolute value of the median, and in a case where an absolute value of the edge component value exceeds a threshold, the processor selects the median as the color difference of the pixel of interest, and in a case where the absolute value of the average exceeds the absolute value of the median and in a case where the absolute value of the edge component value is equal to or less than the threshold, the processor selects the average as the color difference of the pixel of interest.

4. The image processing device as claimed in claim 1, wherein, in a case where an absolute value of the average exceeds an absolute value of the median, and in a case where an absolute value of the edge component value exceeds a threshold, the processor selects the median as the color difference of the pixel of interest, and in a case where the absolute value of the average exceeds the absolute value of the median and in a case where the absolute value of the edge component value is equal to or less than the threshold, the processor selects the average as the color difference of the pixel of interest.

5. An image capturing device, comprising:
an image sensor, outputting first image information in which each pixel has a pixel value of a color of a plurality of different colors; and
an image processing device, comprising:
a processor, configured to:
generate second image information comprising a brightness and a color difference in each pixel by using the first image information;
derive an edge component value of a pixel of interest by performing an edge detection process using the brightness of the pixel of interest and the brightnesses of peripheral pixels of the pixel of interest of the second image information;
derive an average of the color differences of the pixel of interest and the peripheral pixels;
derive a median of the color differences of the pixel of interest and the peripheral pixels; and
select one of the average and the median as the color difference of the pixel of interest by using the edge component value, the average, and the median.

6. The image capturing device as claimed in claim 5, wherein, in a case where an absolute value of the average is equal to or less than an absolute value of the median, the processor selects the average as the color difference of the pixel of interest.

7. The image processing device as claimed in claim 6, wherein, in a case where the absolute value of the average exceeds the absolute value of the median, and in a case where an absolute value of the edge component value exceeds a threshold, the processor selects the median as the color difference of the pixel of interest, and in a case where the absolute value of the average exceeds the absolute value of the median and in a case where the absolute value of the edge component value is equal to or less than the threshold, the processor selects the average as the color difference of the pixel of interest.

8. The image capturing device as claimed in claim 5, wherein, in a case where an absolute value of the average exceeds an absolute value of the median, and in a case where an absolute value of the edge component value exceeds a threshold, the processor selects the median as the color difference of the pixel of interest, and in a case where the absolute value of the average exceeds the absolute value of the median and in a case where the absolute value of the edge component value is equal to or less than the threshold, the processor selects the average as the color difference of the pixel of interest.

* * * * *